United States Patent
Henderson et al.

(10) Patent No.: US 9,024,556 B2
(45) Date of Patent: May 5, 2015

(54) CONTROL OF ELECTRICAL MACHINES

(75) Inventors: Michael Ian Peter Henderson, Leeds (GB); Joseph Gerald Marcinkiewicz, St. Peters, MO (US)

(73) Assignee: Nidec SR Drives, Ltd., Harrowgate, North Yorkshire (GB)

( * ) Notice: Subject to any disclaimer, the term of this patent is extended or adjusted under 35 U.S.C. 154(b) by 244 days.

(21) Appl. No.: 13/534,233

(22) Filed: Jun. 27, 2012

(65) Prior Publication Data

US 2013/0009579 A1    Jan. 10, 2013

(30) Foreign Application Priority Data

Jul. 6, 2011    (GB) .................................. 1111602.7

(51) Int. Cl.
- H02P 6/10    (2006.01)
- H02P 21/00    (2006.01)
- H02P 21/14    (2006.01)

(52) U.S. Cl.
CPC ........................................ H02P 6/10 (2013.01)

(58) Field of Classification Search
USPC .................................................... 318/400.23
See application file for complete search history.

(56) References Cited

U.S. PATENT DOCUMENTS

| | | | |
|---|---|---|---|
| 6,304,052 B1 * | 10/2001 | O'Meara et al. | 318/700 |
| 6,756,757 B2 * | 6/2004 | Marcinkiewicz et al. | 318/432 |
| 8,121,819 B2 * | 2/2012 | Tankard et al. | 702/189 |
| 8,344,706 B2 * | 1/2013 | Green | 323/207 |
| 2009/0021194 A1 * | 1/2009 | Tonami et al. | 318/400.02 |

FOREIGN PATENT DOCUMENTS

JP    2002010696 A    * 1/2002

OTHER PUBLICATIONS

Chai, J.Y.; Liaw, C.M., "Reduction of speed ripple and vibration for switched reluctance motor drive via intelligent current profiling," Electric Power Applications, IET, vol. 4, No. 5, pp. 380, 396, May 2010. URL: http://ieeexplore.ieee.org/stamp/stamp.jsp?tp=&arnumber=5458297&isnumber=5458290.*

Chai (Chai, J.Y.; Liaw, C.N., of record, "Reduction of speed ripple and vibration for switched reluctance motor drive via intelligent current profiling," Electric Power Applications, IET, vol. 4, No. 5, pp. 380,396, May 2010) http://ieeexplore.ieee.org/stamp/stamp.jsp?tp=&arnumber=5458297&isnumber=5458290.*

Lovatt et al., "Computer-optimised current waveforms for switched-reluctance motors", IEE Proc.-Electr. Power Appl., Mar. 1994, pp. 7, vol. 141, No. 2.

* cited by examiner

Primary Examiner — Paul Ip
Assistant Examiner — Said Bouziane
(74) Attorney, Agent, or Firm — Haynes and Boone LLP (57) ABSTRACT

In an electrical machine which has time-varying or position-varying disturbances in its output, signals representing the position and values of machine-related parameters are used to solve a model of the machine to calculate the phase currents which are required to minimize the disturbances. The model is able to provide solutions in the presence of limitations of some of the operating conditions of the machine, for example the supply voltage or the error in the signal representing the position.

20 Claims, 3 Drawing Sheets

CONTROL OF ELECTRICAL MACHINES

CROSS-REFERENCE TO RELATED APPLICATIONS

This patent application claims priority to and the benefit of GB Patent Application No. 1111602.7, filed Jul. 6, 2011, which is incorporated herein by reference in its entirety.

TECHNICAL FIELD

The present invention generally relates to the control of electrical machines. More particularly, the present invention relates to deriving current profiles for use in controlling the currents in the phase windings of the machine so as to reduce the ripple in the output torque of the machine.

BACKGROUND

Electrical machines can generally be operated in either a motoring mode, in which the machine converts an input of electrical energy to mechanical output such as force or torque, or in a generating mode, in which the machine converts an input of mechanical energy to an electrical output, such as current. In both cases, the output can have a time-varying component, which may be due to the input to the machine, the physical design of the machine or imperfections in the construction of the machine such as mechanical or magnetic asymmetry. For example, a brushless direct current (DC) machine operating as a motor may have a ripple component in its output torque which is due to time variations on the DC link supplying the machine, due to the dimensions of the slots in the stator laminations, due to the strengths and positions of the magnets on the rotor, due to manufacturing variance such as issues with encoder positioning, or due to a combination of these.

Much effort has been invested in methods of reducing the time or angle-varying components, particularly in reducing torque ripple in the output of a motor. With sufficient knowledge of the machine, it is possible to calculate current waveforms (also known as current profiles, that is phase currents for each phase specified as a function of rotor angle or time for a given torque demand) which would deliver smooth torque. However, such profiles are typically very sensitive to errors in the signal which describes the angular position of the rotor with respect to the stator, i.e. so-called angle error. Mathematically, this sensitivity is termed the solution sensitivity. A zero sensitivity solution is one which is minimally affected by angle error. For the avoidance of doubt, angle error may be caused by, for example, measurement errors, estimation errors, or discretisation errors due to the way in which the current control law is specified at a limited number of angles, e.g. in a lookup table with or without interpolation).

Prior art methods for reducing output ripple exist, as will now be described.

For example, there are methods which seek to reduce the angle error at source, e.g. by the use of very accurate encoders or resolvers to measure rotor position. These can be effective, but typically are very expensive (the cost of the transducer sometimes approaching the cost of the machine itself) and require precision alignment to the rotor. For mass-production drives, they are not a cost-effective solution. In addition, the rotor position sensor will exhibit errors over the rotation of the motor, particularly in the case of the low cost solutions which may, for example, be required in power steering applications.

Other examples are methods which address the voltage applied (and hence the current supplied) to the machine. Most of these methods take no account of the problem of angle error, so while they appear to provide a workable solution, in practice they are very variable in their effectiveness, since the angle error is unpredictable from drive to drive. For example, the paper "Computer-optimised smooth-torque current waveforms switched reluctance motors" by Lovatt and Stephenson, IEE Proceedings, Electric Power Applications, Vol 144, No 5, September 1997, pp 310-316 presents a method of determining current waveforms, but does not address the problem of errors in the angular information being used in the solutions.

There have been attempts to combine considerations of angular error and applied voltage. For example, U.S. Pat. No. 6,756,757 teaches how to calculate current profiles which result in smooth torque and which also have the property of zero (angle) sensitivity. However, the inventors have realised that this method is limited in that, while the phase currents can be specified in a way to achieve motor operation for a given operating point of speed and torque demand, these currents may require a range of DC link voltages which is not within the capability of the drive system. There are many applications in industry where there is a need to produce a machine output which (a) is not sensitive to angle error, (b) is able to accommodate limits on or variations of the DC link, (c) is not sensitive to manufacturing variations and (d) gives a smooth output.

There is therefore a need for a method of reducing output ripple in an electrical machine which takes account of the limitations of the available DC link voltage and the quality of the signal which describes the rotor position.

SUMMARY

The present invention provides a system and method which overcome the limitations and disadvantages of known methods and provides a method of calculating the appropriate phase currents to achieve a smooth output.

Aspects of the invention provide a method and system for deriving a current profile for energising one or more phases of an electrical machine from a supply to obtain a desired output of the machine.

In some embodiments, a function is defined relating an output of the machine to phase current and sensed position. The current profile is adjusted to simultaneously reduce the difference between the output and a desired output, as well as the sensitivity of the output to errors in the sensed position. The current profile is adjusted such that the currents in the current profile can be supplied by the supply. The current profile is used to control the currents in the one or more phases in accordance with the current profile or is stored in such a way as to be addressable by sensed position on machine-readable storage media ready for use in controlling the electrical machine.

The output may be torque (for example, in a rotating machine). Correspondingly, in a linear machine the output would be force.

In some embodiments, the current profile is adjusted to simultaneously reduce the difference between the output and a desired output, the sensitivity of the output to errors in the sensed position, and a function penalising currents exceeding those that can be supplied by the supply, thereby ensuring that the current can be supplied by the supply. In some embodiments, the function is non zero if the magnitude of a vector containing the phase voltages for the one or more phases exceeds a DC link voltage at which the supply supplies current to the machine. The DC link voltage may be a nominal DC link voltage or maybe sensed by a voltage sensor connected to the DC link. Adjusting the current profile includes solving a set of linked equations in some embodiments, although other methods for adjusting the current profile, such as optimisation of a suitable cost function, constrained or unconstrained, are used in other embodiments. In some embodiments, the set of equations includes a first equation equating the output with the desired output, a second equation equating to zero a function of the sensitivity of the output to errors in sensed position, and a third equation equating to zero a function penalising currents exceeding those that can be supplied by the supply.

In some embodiments, the electrical machine is a permanent magnet machine or a synchronous reluctance machine. In other embodiments the electrical machine is a balanced-fed switched reluctance machine or a hybrid of a permanent magnet machine and a balanced fed switched reluctance machine.

In some embodiments, the electrical machine is operated using the current profile and the current profile is adjusted based on signals received during the operation of the machine. In some embodiments, the machine is operated using the current profile and parameters of the function relating to the output of the machine to phase current and sensed position are adjusted in response to signals received during the operation of the machine. By adapting the current profile and/or function used in its calculation online during the operation of the machine, variations in the machine over time can be tracked and accounted for, ensuring that the current profile is always up to date to achieve the desired control aim.

BRIEF DESCRIPTION OF THE DRAWINGS

The present invention can be put into practice in various ways, some of which will become apparent upon reading the following detailed description of exemplary embodiments of the invention and upon reference to the accompanying drawings, in which.

DETAILED DESCRIPTION

Definitions of Symbols Used

In the descriptions below, the symbols and quantities used have the following definitions:

| Symbol | Definition |
|---|---|
| $\theta$ | Mechanical (rotor) angle (also referred to as position) |
| $T_{Actual}$ | Actual motor shaft torque as a function of current and mechanical angle |
| $I_{\alpha\beta} = [I_{alpha}; I_{beta}]$ | Machine currents in the $\alpha\beta$ frame of reference for a given mechanical angle $\theta$ |
| $I = [I_1; I_2; \ldots I_N]$ | Machine currents in any frame of reference (components n = 1 ... N in relevant reference frame) for a given mechanical angle $\theta$ |
| $T_{Demand}$ | Torque demand |
| $\dfrac{\partial x}{\partial y}$ | Partial derivative of x with respect to y |
| $\epsilon$ | Difference between the dot inner product of the voltages in the $\alpha\beta$ frame of reference and two thirds of the available link voltage squared |
| $V_{\alpha\beta} = [V_\alpha; V_\beta]$ | Machine (phase) voltages in the $\alpha\beta$ frame of reference |
| $V = [V_1; V_2; \ldots V_N]$ | Machine (phase) voltages in any reference frame |
| $V_{dc}$ | DC link voltage |
| $\dfrac{dx}{dy}$ | Derivative of x with respect to y |
| $w_{Voltage}(x)$ | Voltage envelope function evaluated at x |
| $w_{Sensitivity}(x)$ | Sensitivity envelope function evaluated at x |
| $D = \begin{Bmatrix} \text{Torque Demand} \\ \text{Voltage Envelope Function Demand} \\ \text{Sensitivity Envelope Function Demand} \end{Bmatrix}$ | Solver demand, a three by one matrix of: torque demand; demand for voltage envelope function value and demand for sensitivity envelope function value. |
| $A = \begin{Bmatrix} T_{Actual} \\ w_{Voltage} \\ w_{Sensitivity} \end{Bmatrix}$ | Three by one vector of actual values for: torque; voltage envelope function and sensitivity envelope function. |
| $M_{\alpha\beta} = \begin{pmatrix} \dfrac{\partial T_{Actual}}{\partial I_\alpha} & \dfrac{\partial T_{Actual}}{\partial I_\beta} \\ \dfrac{\partial w_{Voltage}}{\partial I_\alpha} & \dfrac{\partial w_{Voltage}}{\partial I_\beta} \\ \dfrac{\partial w_{Sensitivity}}{\partial I_\alpha} & \dfrac{\partial w_{Sensitivity}}{\partial I_\beta} \end{pmatrix}$ | Jacobian matrix with respect to the alpha-beta currents valuated for torque and the voltage and sensitivity envelope functions. |
| $M = \begin{pmatrix} \dfrac{\partial T_{Actual}}{\partial I_1} & \dfrac{\partial T_{Actual}}{\partial I_2} & \cdots & \dfrac{\partial T_{Actual}}{\partial I_N} \\ \dfrac{\partial w_{Voltage}}{\partial I_1} & \dfrac{\partial w_{Voltage}}{\partial I_2} & \cdots & \dfrac{\partial w_{Voltage}}{\partial I_N} \\ \dfrac{\partial w_{Sensitivity}}{\partial I_1} & \dfrac{\partial w_{Sensitivity}}{\partial I_2} & \cdots & \dfrac{\partial w_{Sensitivity}}{\partial I_N} \end{pmatrix}$ | With respect to currents in any frame of reference evaluated for torque and the voltage and sensitivity envelope functions. |
| $\delta I_{\alpha\beta}$ | Iterative change to the alpha-beta currents resultant from one step of the Newton iterative solver. |
| $\delta I$ | Iterative change for currents in any reference frame. |
| $I_{\alpha\beta}$ (new) | New value for the alpha-beta currents calculated by the Newton iterative solver. |
| $I$ (new) | New value for currents in any reference frame. |

-continued

| | |
|---|---|
| $I_{\alpha\beta}$ (old) | Old value for the alpha-beta currents calculated by the Newton iterative solver |
| I (old) | Old value for currents in any reference frame. |
| W | A three by three weighting matrix |

Note that the term "d-axis current injection" is used herein. Alternative terms used in the art are "field weakening" and "phase advance", which have similar meanings.

The invention improves on prior art techniques by calculating reduced sensitivity, smooth torque, current profiles which take account of a limited or time-varying DC link voltage. These solutions are made possible by allowing the sensitivity to angular error to increase when necessary. The calculations allow the sensitivity to vary, that is allowing it to be other than a single fixed value, which allows for greater flexibility in generating a solution and attempting to satisfy the practical operating conditions of the drive.

These improvements allow for the generation of current curves which possess the desired properties, in particular providing the required torque with the desired degree of sensitivity given the value of DC link and the speed of operation. Obviously there will be a need to balance the requirements of the solution given the system state and, in particular, the DC link voltage. One advantage of the proposed scheme is the ability of the system designer to explicitly balance the torque output, sensitivity and being "in volts" (the current being achievable by the available DC link voltage) over all the operating points of the drive.

In order to derive a current profile as a function of mechanical angle which minimises or eliminates torque ripple, a mathematical model providing torque as a function of current, mechanical angle and machine parameters is required. This can take one of many forms, as known in the field of machine modelling, and the particular form of model is not important to this invention. Appropriate models are discussed in, for example, U.S. Pat. No. 6,756,757. If desired, this model can include such effects as mutual inductances between the phase windings and non-linearity in the magnetic circuits, in addition to the more commonly defined machine parameters (e.g., phase resistance, phase inductance, etc.). The model parameters can be obtained from test data gathered from the machine or from calculation. By solving the model for the flux, the torque output of the machine can be calculated by considering the co-energy of the system. The method can be made adaptive if the model parameters are updated as the machine is operated, e.g., by gathering new data using an appropriate parameter estimation scheme.

The definition and estimation of flux models and the corresponding derivation of torque models is discussed in Paul C. Krause, Oleg Wasynczuk and Scott D. Sudhoff, Analysis of Electrical Machinery and Drive Systems, IEEE Power Press Engineering Series, John Wiley and Sons, ISBN 0-471-14326-X, incorporated herein by reference.

Once a model structure is selected, any one of a number of methods can be used for estimating the model parameters from test data, as will be recognised by one skilled in the art. In laboratory development, the preference is to use the Grammian matrix method but in a practical machine drive a recursive least-squares method will be preferable as a result of considering numerical complexity issues. Grammian matrix methods are discussed in N. I. Akhiezer and I. M. Glazman, Theory of Linear Operators in Hilbert Space, Dover Publications, ISBN 0-486-67748-6 and recursive least square methods are discussed in P. E. Wellstead and M. B. Zarrop, Self-tuning Systems: Control and Signal Processing, Wiley and Sons, ISBN 0-471-92883-6, both incorporated herein by reference. In some embodiments, the model parameters are estimated once during design, manufacture or assembly of the machine and are then maintained fixed. In other embodiments, the model parameters are estimated periodically during the operational life of the machine or continuously during operation of the machine. In either case, an analytical model for output torque as a function of machine angle and current is obtained, allowing partial derivatives to be calculated.

As is well known in the art, it is convenient to consider phase currents in different reference frames, depending on the type of machine under consideration. The use of different reference frames and the corresponding coordinate transforms are discussed in the Krause reference mentioned above. For some machines, in particular permanent magnet (PM) machines, balanced fed switched reluctance (SR) machines or hybrids thereof, it is mathematically convenient to work in the $\alpha\beta$ frame of reference, rather than the abc frame of reference, since this reduces the order of complexity in the equations. The more general cases of an arbitrary frame of reference will also be considered below.

The model described above will not, in general, have an analytical solution for current, i.e. in general it is not possible to specify a required torque and calculate the currents, since the equations do not have closed forms. Instead, an iterative method can be adopted where trial current values are chosen and torque is calculated. The currents are then adjusted to move the calculated torque value towards the required value and the torque is recalculated. Such methods are well-known in the field of numerical methods, see for example Alfio Quarteroni, Riccardo Sacco and Fausto Saleri, Numerical Methods, Springer-Verlag, ISBN 0-387-98959-5, incorporated herein by reference.

Figure 1:
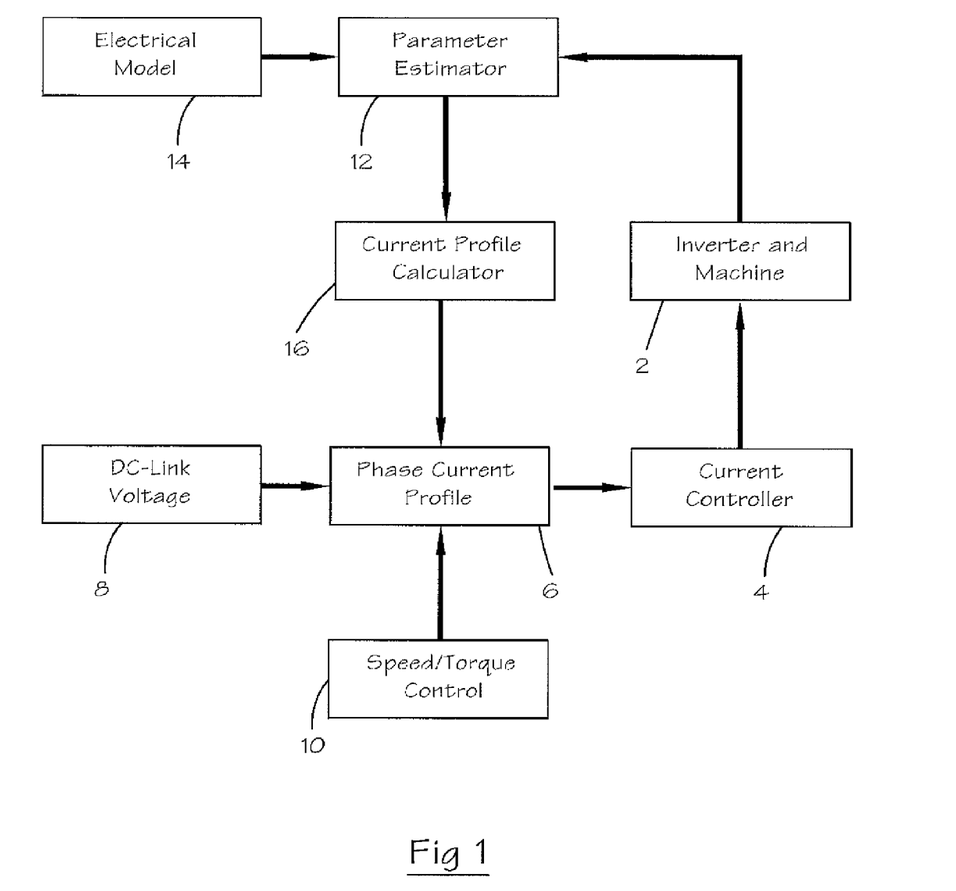
FIG. 1 shows a block diagram of a drive system in accordance with embodiments of the invention.

FIG. 1 depicts a block diagram for a drive system according to one embodiment of the invention. The system comprises a drive 2 including an inverter for energising the phases of a machine of the drive system. The machine has a stationary part (stator) and a part moving relative to the stationary part (rotor) coupled to a shaft for providing the output torque. The inverter is under the control of a current controller 4, as is well known in the art. Desired currents for the current controller 4 are set by a phase current profile 6, which receives inputs of DC link voltage 8 (either a nominal DC link voltage for the drive or a sensed DC link voltage) and of torque demand, angle and speed from a speed torque controller 10, again as well known in the art. See for example Krauss, cited above. It will be understood that the input of speed is optional and not present in some embodiments.

A parameter estimator 12 receives phase voltage, current, speed and angle feedback to estimate the parameters of an electrical model 14, as described in more detail below. In some embodiments, parameter estimation occurs online, the parameter estimator 12 receiving data as described above and updating the estimated parameters while the drive operates. In some embodiments, the parameter estimator is a recursive last squares estimator which includes a forgetting factor. Other embodiments use different estimators, e.g. a Kalman filter. The quality of parameter estimation is in some embodiments examined online by examining the residuals between the output from the electrical model 14 and the feedback from the drive 2. A current profile calculator 16 receives the parameters of the electrical model 14 to calculate or update the current profile 6 using a torque model as described below in detail.

In some embodiments, the parameter estimator 12 and current profile calculator 16 operate in the background while the usual control operations (blocks 2, 4, 6, 8, 10) take place. When parameter estimation, and then current profile calculations are found to be complete, e.g. the residuals referred to above having dropped below a threshold and the profile calculations being completed, the phase current profile is updated with an updated profile from the current profile calculator 16.

In some embodiments, an initial electrical model is defined and initial parameters estimated for a particular machine and drive in a laboratory set up to provide a factory default setting. In use, the drive produces a torque demand, either from the output of a speed loop controller or from a torque controller, depending on the embodiment. The torque demand together with the information discussed above is used to look up a desired current for the phase to input to the current controller 4, which in turn controls the drive 2.

Turning now to the calculation of the current profile, a constraint can be put on the developed torque to require it to equal a torque demand, for example set by a user of the drive. This can be expressed as:

$$T_{Actual}(I,\theta) - T_{Demand} = 0 \quad (1)$$

A further constraint can be set to force the derivative of torque with angle to be zero, ie forcing it to have zero sensitivity:

$$\frac{\partial T_{Actual}(I, \theta)}{\partial \theta} = 0 \quad (2)$$

The Newton iterative family of solvers (see, e.g., Quarteroni, cited above) are an appropriate set of methods for solving (i.e., finding the phase currents) for the coupled equations (1) and (2).

Although phase currents can be found to meet the above conditions in equations (1) and (2), the inventors have realised that this information may be of only academic relevance if the voltages required to produce these currents are beyond the capability of the drive system and that therefore a further constraint should be introduced to ensure that the required voltage is not greater than the DC link voltage. Mathematically, the voltage is defined, when the machine is operating in steady state, as:

$$\epsilon = V^2 - k \cdot V_{dc}^2 \quad (3)$$

where k is a constant determined by any coordinate transformation applied (k=1 if there is no transformation and the phase voltages and currents are used directly and k=2/3 if currents are transformed into the αβ frame of reference). It will be understood that other expressions capturing the concept of being "in volts" are equally possible, for example $\epsilon = |V| - k V_{dc}$ In these equations, a practical solution is given when $\epsilon$ is equal to or less than zero. The DC link voltage $V_{dc}$ may be a nominal, fixed, value of voltage at which the supply is rated to supply current, or an instantaneous actual, sensed DC link voltage in embodiments which instantaneously take account of DC link voltage variations.

Figure 2:
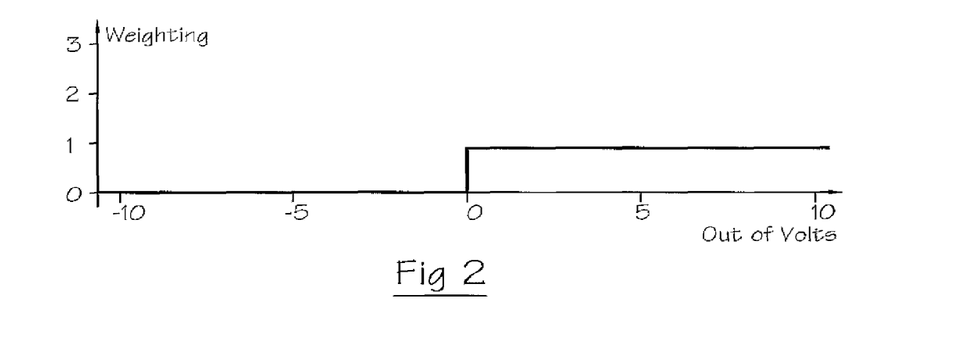
FIG. 2 shows a piecewise linear weighting function.

In the prior art, as typified by U.S. Pat. No. 6,756,757, $\epsilon$ or a similar quantity measuring "in volts" is not taken into account by the solver. To take account of the requirement to be "in volts", embodiments of the invention define a weighting or cost function which is essentially zero for negative or zero values (when the required voltage is within the available DC link voltage) and positive for non-negative values (i.e., the so-called "out of volts" condition, when the DC link voltage is insufficient to sustain the required current). A piecewise linear function is suitable for this, although other functions such as sigmoid functions are also possible. FIG. 2 shows a piecewise linear weighting or cost function in accordance with some embodiments. Use of a weighting function of this general form allows the iterative solutions for the currents to be driven into a practical range where they will yield the minimum torque ripple which can be obtained from a drive within the other constraints imposed.

Figure 3:
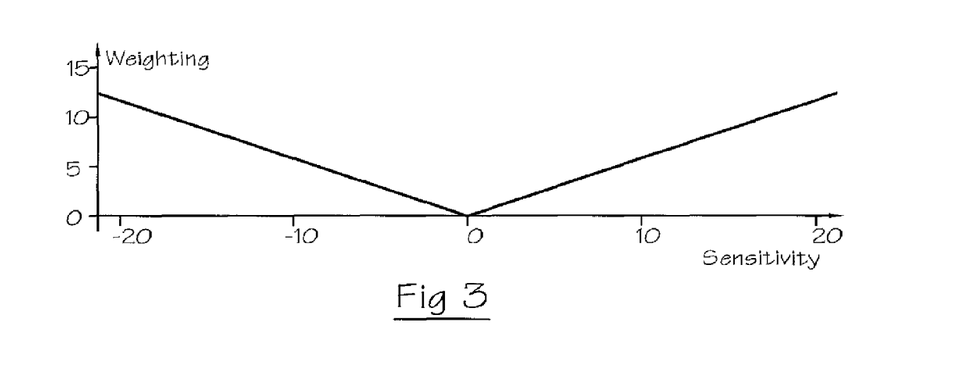
FIG. 3 shows a piecewise linear weighting function applied to sensitivity to angular error.
Figure 4:
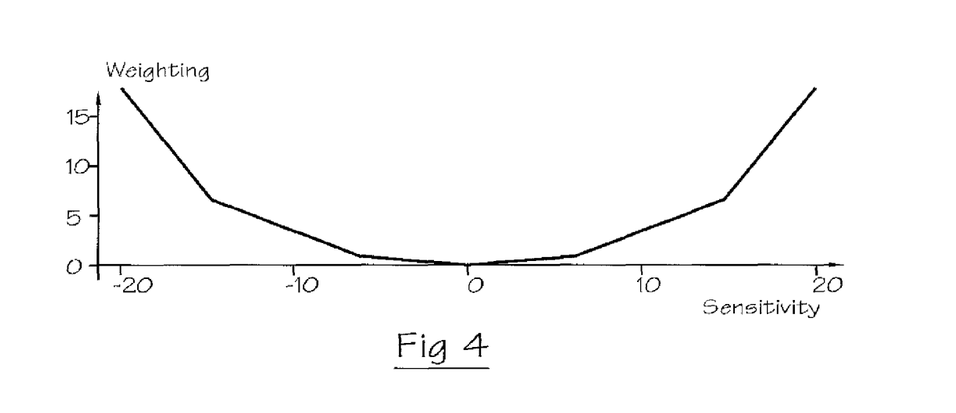
FIG. 4 shows a further weighting function.

In order to find a viable solution in the presence of a constraint on DC link voltage, the sensitivity value must be allowed to move within a range when necessary. A weighting function can also be used to achieve this, in a similar way to that described above. In this way a solution can be achieved which has a sensitivity which is in an allowable range, say [0,6]. Sensitivity has units of Nm/(radian of angular error). FIG. 3 presents a suitable weighting function applied to the sensitivity value in accordance with some embodiments. This function is piece-wise linear and has been chosen such that when the sensitivity is zero, the function has a minimum value; as the sensitivity rises, the weighting rises, so the weighting function encourages the solution to move towards zero sensitivity if there is no other penalty being imposed, e.g. from the voltage constraint. As before, many different weighting functions are possible, e.g., as shown in FIG. 4, shorter segments of line could be used, each segment having an increasing gradient as the sensitivity moves from zero, so that the solution is forced more rapidly into an acceptable area. The importance of the constraints can be adjusted by adjusting the y scaling of the weighting functions.

There are now three coupled equations [(1), (2) and (3)] which are to be solved, taking account of weighting functions like those of FIG. 2 or 3 which will drive the solution to find a solution. Equations (2) & (3) can be re-written as (4) and (5) to reflect the weighting functions:

$$T_{Actual}(I, \theta) - T_{Demand} = 0 \quad (1)$$

$$w_{Sensitivity}\left(\frac{\partial T}{\partial \theta}\right) = 0 \quad (4)$$

$$w_{Voltage}(\varepsilon) = 0 \quad (5)$$

The detailed configuration of the solver depends upon the number of independent currents. If the machine is a switched reluctance machine as traditionally operated with the phase windings in independent electrical circuits, then there will be one independent current for each phase. However, if the phase windings of the machine are commonly connected so that the instantaneous sum of the currents is zero (the so-called "balanced fed" arrangement), there are two independent currents. This situation is encountered with induction, synchronous and permanent magnet machines as well as balanced-fed, switched reluctance machines. In such circumstances where the number of independent currents is different from the number of phases (e.g. 3 in some embodiments) one can use the Moore-Penrose pseudo-inverse (designated by the star suffix) in the iterative solver (See Quarteroni, cited above).

Presenting the equations solved at every iteration of the Newton iterative solver:

Demand:

$$D = \begin{pmatrix} T_{Demand} \\ 0 \\ 0 \end{pmatrix} \quad (6)$$

Actual value:

$$A = \begin{pmatrix} T_{Actual} \\ w_{Voltage}(\varepsilon) \\ w_{Sensitivity}(S) \end{pmatrix} \quad (7)$$

Jacobian matrix:

$$M = \begin{pmatrix} \frac{\partial T_{Actual}}{\partial I_1} & \frac{\partial T_{Actual}}{\partial I_2} & \frac{\partial T_{Actual}}{\partial I_N} \\ \frac{\partial w_{Voltage}}{\partial I_1} & \frac{\partial w_{Voltage}}{\partial I_2} & \frac{\partial w_{Voltage}}{\partial I_N} \\ \frac{\partial w_{Sensitivity}}{\partial I_1} & \frac{\partial w_{Sensitivity}}{\partial I_2} & \frac{\partial w_{Sensitivity}}{\partial I_N} \end{pmatrix} \quad (8)$$

Newton Iterative Update Equations:

$$\delta I = M^* \cdot (D-A) \quad (9)$$

$$I(\text{new}) = I(\text{old}) + \delta I \quad (10)$$

It will be understood that in the case of a traditionally operated switched reluctance machine with independently connected windings and three phases the Jacobian will be a square matrix and $M^* = M^{-1}$, the inverse of the Jacobian. The new value of current is used to calculate quantities such as torque (e.g. by using a flux model and the expression for torque derived via the coenergy or field energy mapping, as described above), sensitivity and voltage requirements in a subsequent iteration. The usual refinements in operating a Newton iterative method remain valid, such as not updating the Jacobian matrix at every iteration (See Quarteroni, cited above).

In the case of currents and voltages defined in the αβ frame of reference (for example in the case of a synchronous, PM or a balanced fed SR machine), equation 3 becomes $$\varepsilon = V_{\alpha\beta}^2 - \tfrac{2}{3} \cdot V_{dc}^2 \quad (3')$$

The Jacobian presented in Equation (8) is now a three by two matrix:

$$M_{\alpha\beta} = \begin{pmatrix} \frac{\partial T_{Actual}}{\partial I_\alpha} & \frac{\partial T_{Actual}}{\partial I_\beta} \\ \frac{\partial w_{Voltage}}{\partial I_\alpha} & \frac{\partial w_{Voltage}}{\partial I_\beta} \\ \frac{\partial w_{Sensitivity}}{\partial I_\alpha} & \frac{\partial w_{Sensitivity}}{\partial I_\beta} \end{pmatrix} \quad (8')$$

Consequentially the Moore-Penrose pseudo-inverse is used in evaluating Equation (9), as indicated by the star suffix above. Otherwise, the Newton iterative method remains unchanged, with equations 1, 9 and 10 changed accordingly by replacing I with $I_{\alpha\beta}$.

In some embodiments, a weighting matrix is placed into the solver, changing this component of the Newton iterative solver from:

$$M^* \cdot (D-A) \quad (11)$$

to $$M^* \cdot W \cdot (D-A) \quad (12)$$

The presence of the weighting matrix adds flexibility. For example, seeking a solution with respect to the voltage constrains independent of sensitivity is achieved by setting the appropriate diagonal entry in the matrix to zero:

$$W = \begin{pmatrix} 1 & 0 & 0 \\ 0 & 1 & 0 \\ 0 & 0 & 0 \end{pmatrix} \quad (13)$$

The weighting matrix is not limited to diagonal entries of 0 and 1 but different weights can be assigned by using any real valued entry on the diagonal (maintaining the off diagonal entries at 0).

The solver may reach any number of solutions dependent upon the value of the starting point (i.e. the "seed"). It is therefore important to seed the solver in a consistent way that helps it reach the desired solution quickly and reliably. Experience has indicated that this is done quite simply by setting the initial values to be that expected of the machine in normal operation. For example, in a 3-phase PM machine this is the usual sinusoidal shape, whereas for a SR machine one would use the more usual unipolar current waveform. The solver may be seeded in this way for each angle at which it operates or one may use the solution obtained at the last angle. Such seeding strategies are valid for synchronous, PM and hybrid or balanced-fed switched reluctance machines.

In some embodiments, given sufficient processing power, the phase currents (for a given torque demand) are calculated online angle by angle while the machine operates. In other embodiments, current values for a discrete set of torque demands and angles are calculated once and stored in a two dimensional (2D) look up table. Hybrids of these two approaches are used in some embodiments, for example, calculating, on the fly, a one dimensional (1D) look up table of current against angle as torque demand changes or periodically recalculating the 1D or 2D tables discussed above to take account of the changes in the machine. As is well known in the art, the 1D or 2D tables can be used directly to look up phase currents or the phase currents can be derived using one or two dimensional interpolation, as applicable, when desired. The table look up returns a current demand value as an input to a current controller for controlling the phase currents accordingly. A two dimensional look-up table is generated in some embodiments, indexed by torque demand and angle. To take account of DC link voltage variation and/or speed, corresponding higher dimensional look up tables are used in some embodiments.

In one embodiment, when the system is first used, the machine parameters are "factory set", that is they are set to their notional values. As time passes and the machine-drive system is used, data is collected. The electrical model, when evaluated using these parameters and data, produces an output which may vary compared to that which is observed. For example, the electrical model is evaluated using the known currents, angle and speed. Using a suitable measure, it is then determined if the parameters used by the model are sufficiently accurate. If they are not then, they are replaced with a new set of parameters.

As the machine and drive are used, data is collected. This data is used to update the machine model. That is, a new estimate of the parameters is calculated using a suitable parameter estimator, like the least squares methods mentioned earlier. A stop point in this update process is determined by when the model is sufficiently accurate in predicting the known applied voltage (as dictated by a threshold on an error value, for example).

Once a new, more accurate, set of parameters has been produced, it is then used to update the current profiles. Below, it will be discussed how the parameters in an electrical model flow naturally into the torque model of the machine It is this torque model together with the analytic partial derivative with respect to angle that is used in the profile solver process. It is also worth noting that the new parameters will be used in the equations that evaluate the out of volts condition. Once current profiles for various torques, speeds and DC link voltage ($V_{dc}$) values have been evaluated, the old lookup table is replaced with the new lookup table. That is, an adaptive step has taken place in the operation of the drive. Fluctuations in the DC link voltage are naturally accommodated as they are a lookup index in the table in some embodiments.

Of course, the system may choose not to update the parameters if the loss of performance is negligible or acceptable. Such a decision may be made for a variety of operational reasons.

It is worth noting that the computational complexity of the lookup problem can be reduced in some embodiments. For example, if the machine has low resistance, then the dimension of the lookup table is reduced by noting that speed and DC link voltage indices can be replaced by a single normalised speed index.

In some embodiments, speed feedback is used to calculate speed error and drive the speed loop controller, while in other embodiments a torque controlled system is provided. Speed itself is also used as a value in the model parameter estimation process, where it appears in the electrical equation.

Details of an exemplary flux model and corresponding torque model and phase voltage model can be found in U.S. Pat. No. 6,756,757, incorporated by reference herein. U.S. Pat. No. 6,756,757 also provides an example of an integrated controller comprising a torque model and corresponding solver and the calculation of the Jacobian with respect to torque and sensitivity.

A discussion of the model used in some embodiments now follows. The most important equations are:

Flux, Equation (15)
Electrical, Equation (19)
Torque, Equation (25)

In overview, a model for flux comprises a sum of coefficients times a function which is the n-tuple of polynomials in phase current and trigonometric functions in the harmonics of angle. These n-tuples form a spanning set which strictly speaking should be orthonormal. For this to be true, the polynomials need to be orthogonal as well. However, with relatively low powers of current it is possible to avoid this added complication. The equation for flux is then substituted into the electrical equation which relates volts to current, speed and angle. Model coefficients can be estimated using test data. The model for flux can then be used to generate a torque model by suitably transforming the model through coenergy to torque. The parameters naturally flow from the electrical model to the torque model when this process is undertaken.

It should be noted that with such an approach the electrical equation residuals can be made arbitrarily small by defining ever more complex models. However, once mapped through coenergy to torque, the resultant model may be, even if on a per cycle basis correct, fundamentally wrong. Such issues are discussed in Billings, cited above. This issue is dealt with in one of two ways. Either the electrical model is carefully built up and the impact upon the torque estimate considered or one simultaneously fits parameters using electrical and torque models with electrical and torque data.

The spanning set is presented as a set of elements. These elements are n-tuples of polynomials in current and trigonometric functions of the harmonic of angle:

($g_1, g_2, \ldots$)

From this a flux model is conjectured, being a linear sum of the elements of the spanning set:

$$\lambda_\phi = \sum_{k=1}^{N_\phi} a_k \cdot g_k$$

Hence the electrical equation is then given by:

$$V_\phi = R_\phi \cdot I_\phi + \frac{d}{dt}\left(\sum_{k=1}^{N_\phi} a_k \cdot g_k\right)$$

It is the constant coefficients which are calculated in the parameter estimation process and which translate directly into the instantaneous torque model.

For phase $\phi$ of a three phase machine, ranging over the set $\{1,2,3\}$, the electrical equation is given by:

$$V_\phi = R_\phi \cdot I_\phi + \frac{d\lambda_\phi}{dt} \tag{14}$$

The parameters of machine shaft angle ($\theta$), machine shaft velocity ($\omega$), the three phase currents ($I_\phi$) and the three phase voltages ($V_\phi$) are used in the model equations. A notional current flow ($I_d$) in the machine magnet equivalent circuit is also required. The model structure adopted for flux is based upon the 5-tuple using sine, cosine and polynomial powers of current and is presented by Equation (15):

$$\lambda_\phi = \sum_{p=0}^{P}\sum_{q=0}^{Q}\sum_{r=0}^{R}\sum_{s=0}^{S}\sum_{n=0}^{N} \begin{bmatrix} a_{\phi pqrn} \cdot \sin(n \cdot \theta) \cdot I_a^p \cdot I_b^q \cdot I_c^r \cdot I_d^s + \\ b_{\phi pqrn} \cdot \cos(n \cdot \theta) \cdot I_a^p \cdot I_b^q \cdot I_c^r \cdot I_d^s \end{bmatrix} \tag{15}$$

By having both sine and cosine 5-tuples there is no need to make any assumptions concerning the relationships between any back-EMF or inductance with respect to rotor angle. A flux model such as that presented above can involve significant numbers of parameters. A reduction in the number of parameters is possible by use of appropriate assumptions. The application of the Park transform reduces the number of current variables from three (abc-reference frame) to two ($\alpha\beta0$-reference frame). With such an assumption and the introduction of the following expressions:

$$f(p,q,r,n) = \sin(n \cdot \theta) \cdot I_\alpha^p \cdot I_\beta^q \cdot I_d^r \tag{16}$$

$$g(p,q,r,n) = \cos(n \cdot \theta) \cdot I_\alpha^p \cdot I_\beta^q \cdot I_d^r \tag{17}$$

Equation (15) is now written:

$$\lambda_\phi = \sum_{p=0}^{P}\sum_{q=0}^{Q}\sum_{r=0}^{R}\sum_{n=0}^{N}[a_{\phi pqm}\cdot f(p,q,r,n) + b_{\phi pqm}\cdot g(p,q,r,n)] \quad (18)$$

Substituting the derivative of flux as presented in Equation (18) into Equation (17) yields:

$$v_\phi = R_\phi \cdot I_\phi + \quad (19)$$

$$\sum_{p=0}^{P}\sum_{q=0}^{Q}\sum_{r=0}^{R}\sum_{n=1}^{N} n\cdot\omega\cdot(a_{\phi pqm}\cdot g(p,q,r,n) - b_{\phi pqm}\cdot f(p,q,r,n)) +$$

$$\sum_{p=1}^{P}\sum_{q=0}^{Q}\sum_{r=0}^{R}\sum_{n=0}^{N} p\cdot\frac{d(I_\alpha)}{dt}\cdot$$

$$[a_{\phi pqm}\cdot f(p-1,q,r,n) + b_{\phi pqm}\cdot g(p-1,q,r,n)] +$$

$$\sum_{p=0}^{P}\sum_{q=1}^{Q}\sum_{r=0}^{R}\sum_{n=0}^{N} q\cdot\frac{d(I_\beta)}{dt}\cdot[a_{\phi pqm}\cdot f(p,q-1,r,n) +$$

$$b_{\phi pqm}\cdot g(p,q-1,r,n)] +$$

$$\sum_{p=0}^{P}\sum_{q=0}^{Q}\sum_{r=1}^{R}\sum_{n=0}^{N} r\cdot\frac{d(I_d)}{dt}\cdot[a_{\phi pqm}\cdot f(p,q,r-1,$$

$$n) + b_{\phi pqm}\cdot g(p,q,r-1,n)]$$

Equation (19) is the mixed static frame of reference (abc- and αβ0-) electrical model for a balanced fed three phase permanent magnet machine.

The presence of rotor magnets is modelled by using an equivalent circuit in which the associated current $I_d$ is constant and the derivative with respect to time is identically zero. This assumption will not hold when machine temperature changes with resultant changes in magnet efficacy. For example, high energy magnets change at approximately 0.1% per degree centigrade. Such a concern need not be a worry for systems in steady state operation, due to the use of an adaptive mechanism or where there is reasonable cooling although it does imply some degradation in performance during thermal transients. Four useful identities are introduced by Equations 20 to 23:

$$a_{\phi pqrn}\cdot I_d^r = A_{\phi pqn} \quad (20)$$

$$b_{\phi pqrn}\cdot I_d^r = B_{\phi pqn} \quad (21)$$

$$F(p,q,r,n) = \sin(n\cdot\theta)\cdot I_\alpha^p I_\beta^q \quad (22)$$

$$G(p,q,r,n) = \cos(n\cdot\theta)\cdot I_\alpha^p I_\beta^q \quad (23)$$

The above identities and the assumption concerning the magnet equivalent circuit allow for Equations 18 and 19 to be rewritten:

$$\lambda_\phi = \sum_{p=0}^{P}\sum_{q=0}^{Q}\sum_{n=0}^{N}[A_{\phi pqn}\cdot\sin(n\cdot\theta)\cdot I_\alpha^p\cdot I_\beta^q + B_{\phi pqn}\cdot\cos(n\cdot\theta)\cdot I_\alpha^p\cdot I_\beta^q] \quad (24)$$

$$v_\phi = \quad (25)$$

$$R_\phi\cdot I_\phi + \sum_{p=0}^{P}\sum_{q=0}^{Q}\sum_{n=1}^{N} n\cdot\omega\cdot[A_{\phi pqn}\cdot G(p,q,n) - B_{\phi pqn}\cdot F(p,q,n)] +$$

$$\sum_{p=1}^{P}\sum_{q=0}^{Q}\sum_{n=0}^{N} p\cdot\frac{d(I_\alpha)}{dt}\cdot$$

$$[A_{\phi pqn}\cdot F(p-1,q,n) + B_{\phi pqn}\cdot G(p-1,q,n)] +$$

$$\sum_{p=0}^{P}\sum_{q=1}^{Q}\sum_{n=0}^{N} p\cdot\frac{d(I_\beta)}{dt}\cdot[A_{\phi pqn}\cdot F(p,q-1,n) +$$

$$B_{\phi pqn}\cdot G(p,q-1,n)] +$$

Equation 25 is that used by the adaptive parameter estimation scheme, the coefficients present in the right hand side of Equations 20 and 21 being those which are estimated. It is possible to deal with some of the problems associated with current measurement, such as offset, by introducing some additional terms not related to the dynamics of the machine into Equation 25. In particular, the resistive component of the model can be replaced by the expression:

$$R_\phi + R_{\phi\alpha}\cdot I_\alpha + R_{\phi\beta}\cdot I_\beta + R_{\phi\alpha\beta}\cdot I_\alpha\cdot I_\beta$$

An expression for instantaneous torque is derivable from the electrical model via the expression for coenergy using a standard method (e.g., see Krauss, cited above). It is seen that the estimated coefficients from the electrical model map directly to the expression for torque:

$$T = \sum_{p=0}^{P}\cdot\sum_{q=0}^{Q}\cdot\sum_{n=1}^{N}\left\{\frac{n}{p+1}\cdot\left[\begin{array}{c}\left(A_{apqn} - \frac{A_{bpqn}}{2} - \frac{A_{cpqn}}{2}\right)\cdot\\ G(p+1,q,n) \\ \left(-B_{apqn} - \frac{B_{bpqn}}{2} - \frac{B_{cpqn}}{2}\right)\cdot\\ F(p+1,q,n)\end{array}\right]\right\} + \quad (26)$$

$$\sum_{q=0}^{Q}\sum_{n=1}^{N}\left[\begin{array}{c}\frac{\sqrt{3}}{2}\cdot\frac{n}{q+1}\cdot(-A_{b0qn} + A_{c0qn})\cdot\\ G(p,q+1,n) + \\ (B_{b0qn} - B_{c0qn})\cdot F(p,q+1,n)\end{array}\right] +$$

$$\sum_{r=0}^{R}\frac{I_d^r}{r+1}\cdot\sum_{n=1}^{N}[n\cdot(a_{d00n}\cdot\cos(n\cdot\theta) - b_{d00n}\cdot\sin(n\cdot\theta))]$$

The constant terms, unobservable directly via the terminal variables using the approach outlined here, appear in the third double summation of Equation 26 and are grouped together:

$$\sum_{r=0}^{R}\frac{I_d^r}{r+1}\cdot a_{\phi 00n}\cdot n = c_{\phi 00n} \quad (27)$$

$$\sum_{r=0}^{R}\frac{I_d^r}{r+1}\cdot b_{\phi 00n}\cdot n = d_{\phi 00n} \quad (28)$$

Substitution of the constant terms defined by Equations 27 and 28 into Equation 26 yields:

$$T = \sum_{p=0}^{P} \cdot \sum_{q=0}^{Q} \cdot \sum_{n=1}^{N} \left\{ \frac{n}{p+1} \cdot \left[ \begin{array}{c} \left(A_{apqn} - \frac{A_{bpqn}}{2} - \frac{A_{cpqn}}{2}\right) \cdot \\ G(p+1, q, n) \\ + \\ \left(-B_{apqn} - \frac{B_{bpqn}}{2} - \frac{B_{cpqn}}{2}\right) \cdot \\ F(p+1, q, n) \end{array} \right] \right\} + \quad (29)$$

$$\sum_{q=0}^{Q} \sum_{n=1}^{N} \left[ \frac{\sqrt{3}}{2} \cdot \frac{n}{q+1} \cdot (-A_{b0qn} + A_{c0qn}) \cdot G(p, q+1, n) + \right.$$

$$\left. (B_{b0qn} - B_{c0qn}) \cdot F(p, q+1, n) \right] +$$

$$\sum_{n=1}^{N} (c_{d0qn} \cdot \cos(n \cdot \theta) + d_{d0qn} \cdot \sin(n \cdot \theta))$$

The model presented by Equation 29 includes the significant dynamics of the torque-producing mechanism in a motor which are critical to solving for smooth torque and provides an estimate of instantaneous torque. Additionally this formulation for torque estimation neatly by-passes the need to carry out integration type activities. In particular, it includes those torque components which result from the interaction of stator current flow and the magnets, terms which one could describe as the current-dependent cogging components, as well as linear and non-linear saturation effects. Such components can be significant if the machine operates in saturation or if deviation from constant torque is an issue. It is desirable to manage the complexity of such expressions, the model complexity being governed by a desire to deal with only the significant torque harmonics and non-linear components. This directly affects the frequency content of the proposed solution and the ability of the machine drive to meet the demands imposed upon it.

No formal proof of the unobservable nature of the single summation coefficients ($c_{d0qn}$ and $d_{d0qn}$) in Equation 29 is presented, but it is clear from Equation 26 that they cannot be directly estimated using terminal variables. In the laboratory, the unobservable parameters can be estimated through the use of a dynamometer and the fitting of a Fourier series to the measured torque ripple while the machine phases are open circuit. A less direct but more practical method has been described previously in USA patent U.S. Pat. No. 6,756,757. A general discussion of the types of systems that are controllable or observable is given in, for example, Control System Design: An Introduction to State-Space Control Methods, Bernard Friedland, McGraw-Hill Book Company (1987), ISBN 0-07-100420-3, incorporated by reference herein.

The Jacobian matrix discussed above consists of partial derivatives of torque with respect to current and sensitivity with respect to currents. Recall that sensitivity is itself the partial derivative of torque with respect to angle. To evaluate the Jacobian, the respective analytical partial derivatives are calculated using the equations discussed above, or similar equations adapted for specific machines.

A specific embodiment will now be described, showing how the solution can be applied to a specific type of machine.

In the examples which follow, torque ripple is defined as:

$$\text{Ripple} = (T_{max} - T_{min})/T_{mean} \quad (14)$$

where $T_{max}$ is the maximum value of instantaneous torque over a rotor cycle, $T_{min}$ is the minimum value of instantaneous torque over a rotor cycle, $T_{mean}$ is the mean torque over a rotor cycle, for a constant torque demand. Other definitions are known in the art and may equally be used, e.g. replacing $T_{mean}$ with the maximum rated torque.

The described method of determining currents can be applied to many electrical machines, including synchronous, permanent magnet, hybrid and SR machines. As an illustration, it is applied here a three-phase, balanced-fed PM machine with reluctance torque capable of providing somewhere between 20% and 30% of the output. Using the prior art method, for example, as described in Lovatt and Stephenson, of calculating sinusoidal current profiles, a torque demand is set up and a current profile to meet this demand is produced by solving for the current at a suitable number of points over a rotor cycle. (This solution, of course, assumes that the angular information has no errors and that there are no discretisation errors.) Point A on FIG. 5 corresponds to this condition, i.e., the ripple is zero for zero angular error (measurement or discretisation related). If now the current profiles are kept constant and the torque is calculated for a series of points where there is error in the angular information, the torque ripple can be calculated for each point and plotted on FIG. 5. This gives the V-shaped graph marked P. This shows that, while the torque ripple is zero when the angular error is zero (i.e. Point A), the ripple rises quite rapidly when even small amounts of error are present in the angular information, a situation which would be common in a practical drive system.

Figure 5:
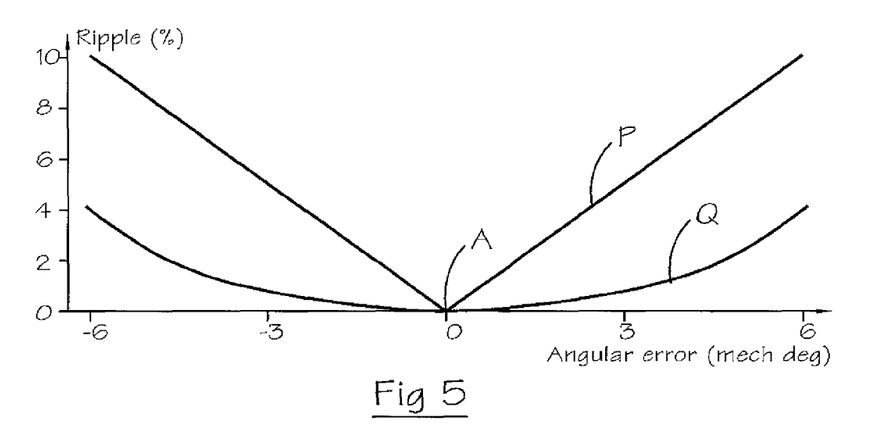
FIG. 5 shows torque ripple as a function of angular error.
Figure 6:
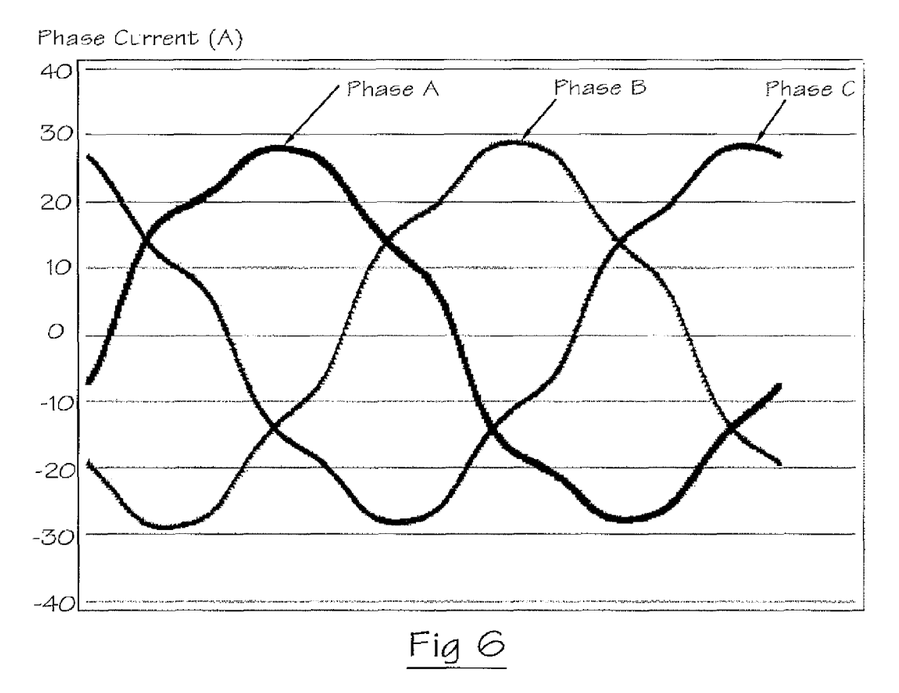
FIG. 6 shows a current profile.

Using now the described method to calculate current profiles which are designed with the sensitivity of torque ripple to angle errors and being "in volts" in mind (i.e., as described by Equations 1-13), the exercise can be repeated. The current profiles are shown in FIG. 6. The results for the torque ripple are shown as graph Q in FIG. 5. The plots and results presented in FIGS. 5 and 6 are based upon a model fitted using experimental data gathered from an interior permanent magnet machine, designed for a 410 volt DC link and having six rotor pole-pairs. The machine is rated for 8 kW.

The results show that the described method yields current solutions which are much less sensitive to error in the angular information than a conventional solution. For small errors, there is virtually no increase in torque ripple, while for larger errors, the increase in torque ripple is less than half that experienced with the prior art solution. This demonstrates the effectiveness of the approach.

The invention may be applied to permanent magnet, switched reluctance and hybrid machines, although the details of implementation will vary from machine to machine. Similar results can be achieved for a machine with independently fed windings, e.g. a typical switched reluctance machine. The industrial applications where such a method will be of use are those requiring current profiles exhibiting one or more of: smooth torque or a substantial amount of control of the instantaneous torque over a mechanical cycle; zero or reduced sensitivity of the torque to angle error; and some degree of adaptability of the control system to machine manufacturing variance.

As this invention uses a mathematical model of the machine for which parameters are estimated by using data which can be gathered at the machine terminals rather than by measurements internal to the machine, it is particularly suitable for those situations where non-linearity of the magnetic circuits, mutual inductances between phases, etc, play a significant role in the behaviour of the machine. The advantages of the adaptive mechanism are also evident. Typical applications where some or all of these requirements exist are traction systems, elevator hoists, marine propulsion, power steering, etc.

The skilled person will appreciate that variation of the disclosed arrangements are possible without departing from the invention. In particular, the invention is applicable for drives or generators having any practical number of phases N=1, 2, 3, 4, ...

While the above description refers to calculations in terms of "mechanical angle", it will be understood that the invention is not limited to any particular coordinate system for the angle measurements, as long as the position of the machine's moveable part relative to its stationary part is provided. Thus, coordinate systems can be used in which a full cycle of angle measurements corresponds a full rotation of the movable part (in case of rotating machines), an electrical cycle, or any other suitable cycle.

There are several different methods, any one of which can be used to solve the numerical problem of simultaneously satisfying the constraints discussed above. For example, the solver could be implemented as a learning algorithm, commonly involving neural networks and/or fuzzy logic, genetic algorithms or the like. Specifically, one may choose to approach the solver in terms of optimisation, the quantity being optimised (minimised/maximised) being the dot inner product of a cost function: find x* such that F'(x*)·F(x*) is a minimum/maximum. With such an approach one may choose to impose or not various constraints (constrained or unconstrained optimisation).

Although the above specific description is made in terms of rotating machines, making reference to output shaft torque, mechanical or rotor angle, etc., it will be understood that the invention is equally applicable to linear machines (e.g. having a force output) and the description made above is to be construed accordingly, with the term rotor being understood to mean a linearly moving member and mechanical or rotor angle referring to its linear displacement. Accordingly, the above description of several embodiments is made by way of example and not for the purposes of limitation. It will be clear to the skilled person that minor modifications can be made to the arrangements without significant changes to the operation described above. The present invention is intended to be limited only by the scope of the following claims.

The invention claimed is:

1. A method of deriving a current profile for energising one or more phases of an electrical machine from a supply to obtain a desired output of the machine, the electrical machine having a stationary part and a moveable part moveable relative to the stationary part to provide the desired output, the method comprising:
  defining, using a parameter estimator, a function relating an output of the machine to phase current and a sensed position of the moveable part relative to the stationary part;
  adjusting, using a current profile calculator, the current profile to simultaneously reduce the difference between the output and a desired output and the sensitivity of the output to errors in the sensed position, wherein adjusting the current profile includes ensuring that the currents in the current profile can be supplied by the supply based on a function penalising currents exceeding those that can be supplied by the supply; and
  controlling the current, using a current controller, in the one or more phases in accordance with the current profile or storing the current profile addressable by sensed position on a machine readable storage medium ready for use in controlling the electrical machine.

2. A method as claimed in claim 1 in which the output is torque.

3. A method as claimed in claim 1, including adjusting the current profile to simultaneously reduce the difference between the output and the desired output, the sensitivity of the output to errors in the sensed position, and the function penalising currents exceeding those that can be supplied by the supply.

4. A method as claimed in claim 3 in which the penalising function is non-zero if the magnitude of a vector containing the phase voltages for the one or more phases exceeds a DC link voltage at which the supply supplies current to the machine.

5. A method as claimed in claim 4, in which the DC link voltage is a nominal DC link voltage.

6. A method as claimed in claim 4, in which the DC link voltage is a sensed DC link voltage.

7. A method as claimed in claim 1, in which adjusting the current profile includes solving a set of linked equations, the set including a first equation equating the output with a desired output, a second equation equating to zero a function of the sensitivity of the output to errors in sensed position and a third equation equating to zero the function penalising currents exceeding those that can be supplied by the supply.

8. A method as claimed in claim 1, in which the electrical machine is one of a synchronous machine, a permanent magnet machine, a balanced fed switched reluctance machine and a hybrid thereof.

9. A method as claimed in claim 1, including operating the electrical machine using the current profile and adjusting the current profile based on signals received during the operation of the electrical machine.

10. A method as claimed in claim 1, including operating the electrical machine using the current profile and adjusting parameters of the function relating the output of the machine to phase current and sensed position in response to signals received during the operation of the machine.

11. A system for deriving a current profile for energising one or more phases of an electrical machine from a supply to obtain a desired output of the machine, the electrical machine having a stationary part and a moveable part moveable relative to the stationary part to provide the desired output, the system comprising:
  means for defining a function relating an output of the machine to phase current and a sensed position of the moveable part relative to the stationary part;
  means for adjusting the current profile to simultaneously reduce the difference between the output and a desired output and the sensitivity of the output to errors in the sensed position, wherein the means for adjusting the current profile include means for ensuring that the currents in the current profile can be supplied by the supply based on a function penalising currents exceeding those that can be supplied by the supply; and
  means for controlling the current in the one or more phases in accordance with the current profile.

12. A system as claimed in claim 11 in which the output is torque.

13. A system as claimed in claim 11, including means for adjusting the current profile to simultaneously reduce the difference between the output and the desired output, the sensitivity of the output to errors in the sensed position, and the function penalising currents exceeding those that can be supplied by the supply.

14. A system as claimed in claim 13 in which the penalising function is non-zero if the magnitude of a vector containing the phase voltages for the one or more phases exceeds a DC link voltage at which the supply supplies current to the machine.

15. A system as claimed in claim 14, in which the DC link voltage is a nominal DC link voltage.

16. A system as claimed in claim 14, in which the DC link voltage is a sensed DC link voltage.

17. A system as claimed in claim 11 in which the means for adjusting the current profile includes means for solving a set of linked equations, the set including a first equation equating output with a desired output, a second equation equating to zero a function of the sensitivity of the output to errors in sensed position and a third equation equating to zero the function penalising currents exceeding those that can be supplied by the supply.

18. A system as claimed in claim 11, in which the electrical machine is one of a permanent magnet machine, a balanced fed switched reluctance machine and a hybrid thereof.

19. A system as claimed in claim 11, wherein the means for adjusting the current profile is based on signals received during the operation of the electrical machine.

20. A system as claimed in claim 11, further comprising means for adjusting parameters of the function relating the output of the machine to phase current and sensed position in response to signals received during the operation of the machine.

* * * * *

UNITED STATES PATENT AND TRADEMARK OFFICE
CERTIFICATE OF CORRECTION

PATENT NO. : 9,024,556 B2  
APPLICATION NO. : 13/534233  
DATED : May 5, 2015  
INVENTOR(S) : Michael Ian Peter Henderson et al.

Page 1 of 1

It is certified that error appears in the above-identified patent and that said Letters Patent is hereby corrected as shown below:

In the Specification

Column 5, Line 55: change "Wasynezuk" to --Wasynczuk--

Signed and Sealed this
Eighteenth Day of August, 2015

Michelle K. Lee
*Director of the United States Patent and Trademark Office*